United States Patent
Lin et al.

(10) Patent No.: US 11,035,160 B2
(45) Date of Patent: Jun. 15, 2021

(54) SYNCHRONOUS HINGE MODULE

(71) Applicants: Che-Hsien Lin, Taipei (TW); Tsai-Ta Teng, Taipei (TW); Che-Hsien Chu, Taipei (TW); Hung-Jui Lin, Taipei (TW); Chun-An Shen, Taipei (TW); Ko-Yen Lu, Taipei (TW); Po-Hsiang Hu, Taipei (TW)

(72) Inventors: Che-Hsien Lin, Taipei (TW); Tsai-Ta Teng, Taipei (TW); Che-Hsien Chu, Taipei (TW); Hung-Jui Lin, Taipei (TW); Chun-An Shen, Taipei (TW); Ko-Yen Lu, Taipei (TW); Po-Hsiang Hu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/544,921

(22) Filed: Aug. 20, 2019

(65) Prior Publication Data

US 2020/0063476 A1 Feb. 27, 2020

Related U.S. Application Data

(60) Provisional application No. 62/720,906, filed on Aug. 21, 2018.

(51) Int. Cl.
*E05D 7/00* (2006.01)
*E05D 3/06* (2006.01)
*G06F 1/16* (2006.01)

(52) U.S. Cl.
CPC ............. *E05D 3/06* (2013.01); *G06F 1/1681* (2013.01); *E05Y 2900/606* (2013.01)

(58) Field of Classification Search
CPC .. E05D 3/12; E05D 3/122; E05D 3/06; E05D 3/10; E05D 11/082; E05D 11/087;
(Continued)

(56) References Cited

U.S. PATENT DOCUMENTS 8,720,011 B1 * 5/2014 Hsu ................... G06F 1/1681
16/368
9,606,583 B2 * 3/2017 Ahn ................... G06F 1/1652
(Continued)

FOREIGN PATENT DOCUMENTS

CN 204061528 U * 12/2014
CN 204327738 5/2015
(Continued)

OTHER PUBLICATIONS

"Office Action of Taiwan Counterpart Application", dated Apr. 22, 2020, p.1-p.8.
(Continued)

*Primary Examiner* — Chuck Y Mah
(74) *Attorney, Agent, or Firm* — JCIPRNET (57) ABSTRACT

A synchronous hinge module includes a first axle, a second axle, a third axle, a fourth axle, at least one central frame, at least two connecting bases, a plurality of first baffle plates, at least two side frames, and a plurality of second baffle plates. The at least one central frame is disposed around the first axle and the second axle. The at least two connecting bases are engaged with two opposite ends of the at least one central frame respectively. The plurality of first baffle plates is respectively disposed around the first axle, the third axle and the second axle, the fourth axle. Each of the first baffle plates extends outside each of the at least two connecting bases and the at least one central frame.

14 Claims, 9 Drawing Sheets

(58) Field of Classification Search
CPC ............. E05D 2011/085; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/541

See application file for complete search history.

(56) References Cited

U.S. PATENT DOCUMENTS

| | | | |
|---|---|---|---|
| 9,684,343 B2* | 6/2017 | Tazbaz | G06F 1/1681 |
| 9,719,280 B2* | 8/2017 | Tian | H04M 1/022 |
| 9,921,611 B2* | 3/2018 | Wang | G06F 1/1681 |
| 10,037,058 B2* | 7/2018 | Kato | E05D 3/06 |
| 2010/0232100 A1* | 9/2010 | Fukuma | H04M 1/0216 361/679.01 |
| 2012/0096678 A1* | 4/2012 | Zhang | G06F 1/1681 16/302 |
| 2014/0174227 A1* | 6/2014 | Hsu | E05D 3/14 74/98 |
| 2014/0245569 A1* | 9/2014 | Cho | E05D 3/122 16/370 |
| 2015/0176317 A1* | 6/2015 | Lee | E05D 3/06 16/251 |
| 2016/0090763 A1* | 3/2016 | Hsu | E05D 3/122 16/354 |
| 2019/0274227 A1* | 9/2019 | Hsu | H05K 5/0226 |

FOREIGN PATENT DOCUMENTS

| | | |
|---|---|---|
| CN | 105317821 | 2/2016 |
| CN | 205689578 | 11/2016 |
| TW | M541537 | 5/2017 |
| TW | M544752 | 7/2017 |

OTHER PUBLICATIONS

"Office Action of China Counterpart Application", dated Mar. 2, 2021, p.1-p.12.

* cited by examiner

SYNCHRONOUS HINGE MODULE

CROSS-REFERENCE TO RELATED APPLICATION

This application claims the priority benefit of U.S. provisional application Ser. No. 62/720,906, filed on Aug. 21, 2018. The entirety of each of the above-mentioned patent applications is hereby incorporated by reference herein and made a part of this specification

BACKGROUND OF THE INVENTION

1. Field of the Invention

The present invention relates to a hinge module, and more particularly, to a synchronous hinge module with a protective structure.

2. Description of Related Art

The existing notebook computer is composed of a screen and a system terminal that can be simultaneously opened and simultaneously closed. The main component for realizing this function is a synchronous hinge module connected between a screen cover and a system casing. The synchronous hinge module allows the screen cover to be positioned and adjusted to any angle to suit the operating needs of different environments.

The existing synchronous hinge module is composed of a plurality of limiting structures meshing with each other and a plurality of axles. During a rotating process, the limiting structures may catch foreign matters and cannot smoothly rotate. Therefore, the existing synchronous hinge module is not suitable for being applied on products covered with leather or cloth. In addition, if the synchronous hinge module is applied to a product with casing protection, the limiting structures easily collide with the casing to cause damage during a mounting process. In order to solve the above shortcomings, a hinge structure with a protection function in the present application is provided.

SUMMARY OF THE INVENTION

A synchronous hinge module, which avoids catching foreign matters during operation and reduces collision damage is provided.

A synchronous hinge module of the present invention comprises a first axle, a second axle, a third axle, a fourth axle, at least one central frame, at least two connecting bases, a plurality of first baffle plates, at least two side frames, and a plurality of second baffle plates. The second axle is parallel to the first axle. The third axle is disposed outside the first axle. The fourth axle is disposed outside the second axle. The at least one central frame is disposed around the first axle and the second axle. The at least two connecting bases are respectively disposed around the third axle and the fourth axle and respectively engaged with two opposite ends of the at least one central frame. The plurality of first baffle plates is respectively disposed around the first axle, the third axle and the second axle, the fourth axle. Each of the first baffle plates extends outside each of the at least two connecting bases and the at least one central frame. The at least two side frames are respectively disposed around the first axle, the third axle and the second axle, the fourth axle and engaged with each other. The plurality of first baffle plates is disposed around the first axle and the second axle. Each of the second baffle plates extends outside the at least two side frames.

Based on the above, in the synchronous hinge module, a plurality of first baffle plates extending outside the at least one central frame and the at least two connecting bases are provided to block the foreign matters from being caught in the engagement region of the central frame and the connecting bases and also prevent the central frame from directly colliding with external objects and causing damage. A plurality of second baffle plates extending outside the at least two side frames are further provided to block foreign matters from being caught in the engagement region between the side frames and also prevent the side frames from directly colliding with external objects and causing damage, thereby ensuring the stability of the synchronous hinge module in an operation state.

A synchronous hinge module includes a first axle, a second axle, a third axle, a fourth axle, at least one central frame, at least two connecting bases, a plurality of first baffle plates, at least two side frames, a plurality of second baffle plates, and a lateral protective plate. The second axle is parallel to the first axle. The third axle is disposed outside the first axle. The fourth axle is disposed outside the second axle. The at least one central frame is disposed around the first axle and the second axle. The at least two connecting bases are respectively disposed around the third axle and the fourth axle and respectively engaged with two opposite ends of the at least one central frame. The plurality of first baffle plates is respectively disposed on the third axle and the fourth axle. Each of the first baffle plates extends outside each of the at least two connecting bases. The at least two side frames are respectively disposed around the first axle, the third axle and the second axle, the fourth axle and engaged with each other. The plurality of first baffle plates is disposed around the first axle and the second axle. Each of the second baffle plates extends outside the at least one central frame. The lateral protective plate is disposed around the first axle and the second axle and partially covers the at least two side frames and the at least one central frame.

Based on the above, in the synchronous hinge module, a lateral protective plate is further provided to cover the at least two side frames, so as to avoid the exposure of the engagement region to block foreign matters from being caught and reduce damage, thereby ensuring the stability of the synchronous hinge module in the operation state.

In order to make the aforementioned and other features and advantages comprehensible, embodiments accompanied with figures are described in detail below.

DESCRIPTION OF THE EMBODIMENTS

Figure 1A:
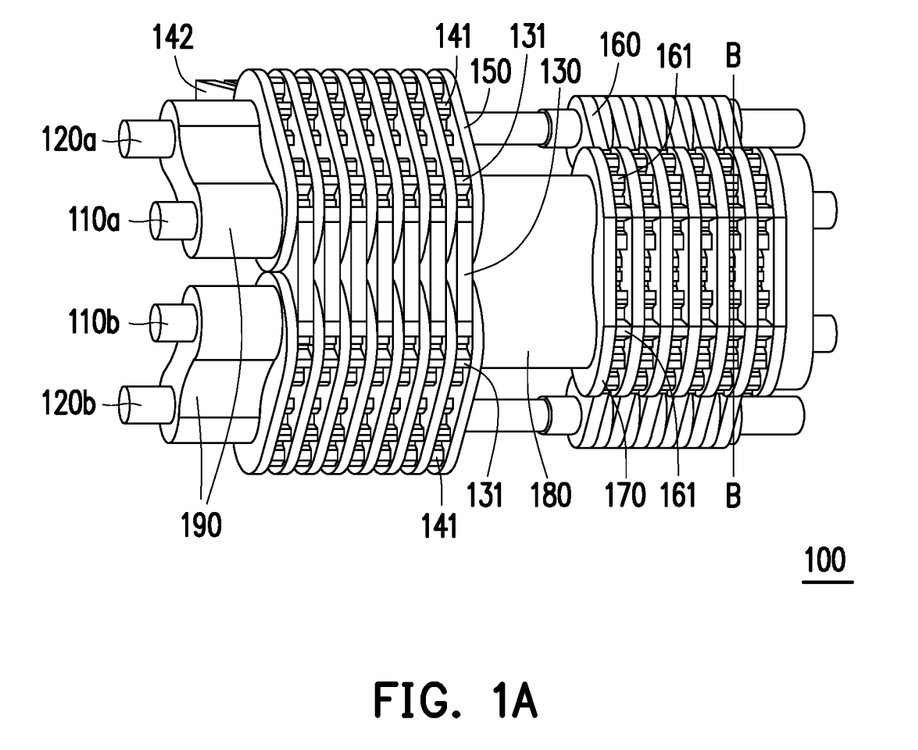
FIG. 1A is a three-dimensional schematic diagram of a synchronous hinge module according to an embodiment.
Figure 1B:
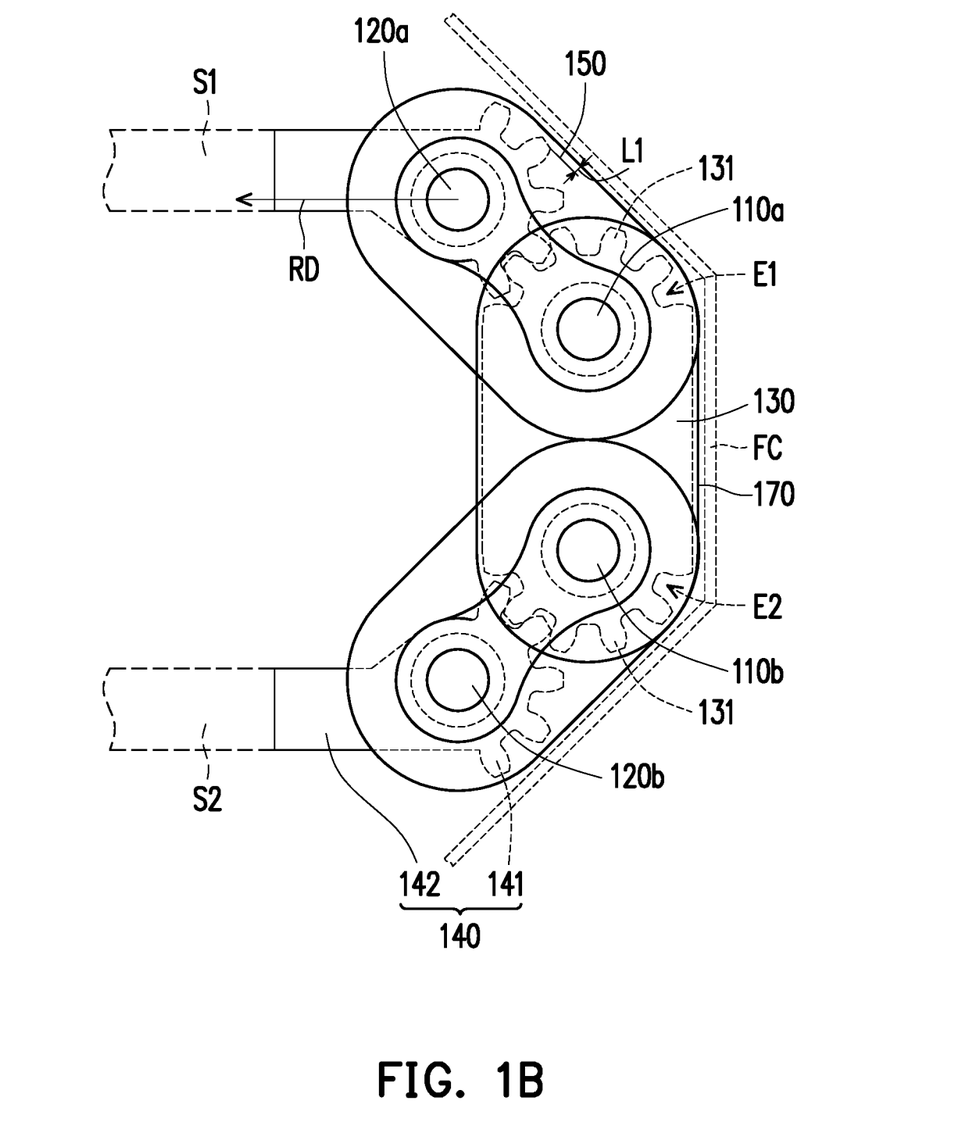
FIG. 1B is a side structure perspective view of the synchronous hinge module of FIG. 1A.
Figure 1C:
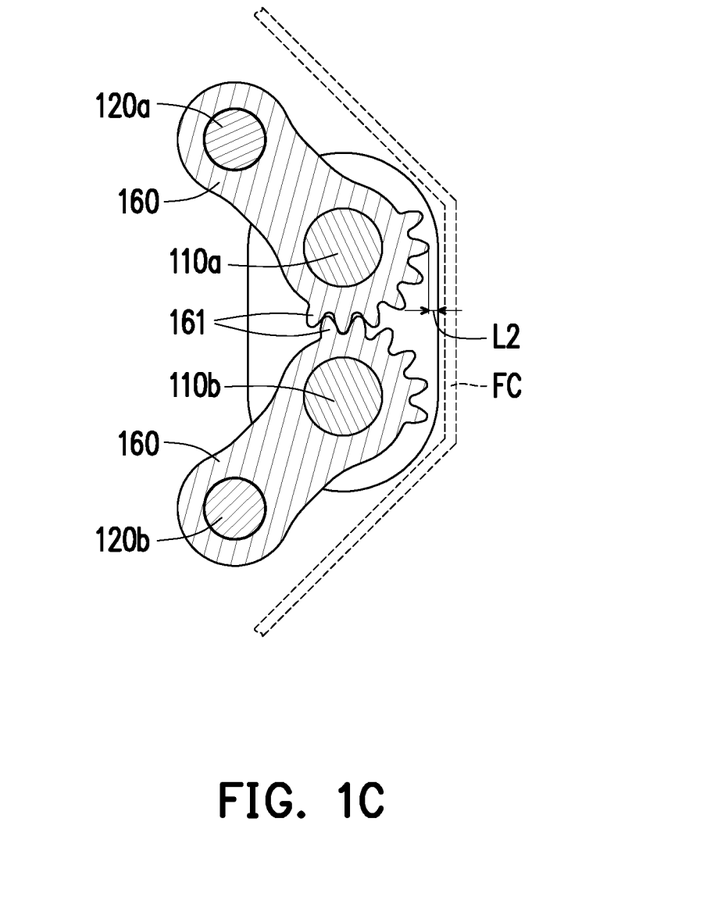
FIG. 1C is a partial structure perspective view of the synchronous hinge module of FIG. 1A taken along section B-B.

FIG. 1A is a three-dimensional schematic diagram of a synchronous hinge module according to an embodiment. FIG. 1B is a side structure perspective view of the synchronous hinge module of FIG. 1A. FIG. 1C is a partial structure perspective view of the synchronous hinge module of FIG. 1A taken along section B-B.

Referring to FIG. 1A and FIG. 1B, a synchronous hinge module 100 of the present embodiment is adapted to carry two bodies S1 and S2 of an electronic device to facilitate synchronous opening or synchronous closing. The electronic device is, for example, a notebook computer. The two bodies S1 and S2 are, for example, a system terminal and a display terminal of the notebook computer, and the two bodies S1 and S2 are connected to each other through the synchronous hinge module 100.

The synchronous hinge module 100 of the present embodiment includes a first axle 110a, a second axle 110b, a third axle 120a, a fourth axle 120b, at least one central frame 130, at least two connecting bases 140, a plurality of first baffle plates 150, at least two side frames 160, a plurality of second baffle plates 170, a central torsion member 180, and two auxiliary torsion members 190.

The first axle 110a and the second axle 110b are arranged at intervals and in parallel. The third axle 120a and the fourth axle 120b are respectively disposed in parallel outside the first axle 110a and the second axle 110b. The number of the at least one central frame 130 is, for example, plural, and each of the central frames 130 is disposed around the first axle 110a and the second axle 110b. The number of the at least two connecting bases 140 is, for example, plural, and the plurality of connecting bases 140 is respectively disposed around the third axle 120a and the fourth axle 120b and respectively engaged with the two opposite ends of the corresponding central frame 130. For example, the central frame 130 is adapted to be engaged with the two connecting bases 140. The two connecting bases 140 are symmetrically disposed up and down. One of the connecting bases 140 is used for fixing the body S1, and the other connecting base 140 is used for fixing the body S2.

Referring to FIG. 1A to FIG. 1C, the plurality of first baffle plates 150 is respectively disposed around the first axle 110a, the third axle 120a and the second axle 110b, the fourth axle 120b. Each of the first baffle plates 150 extends outside each of the at least two connecting bases 140 and the at least one central frame 130. In detail, one first baffle plate 150 disposed around the first axle 110a and the third axle 120a is adapted to abut the corresponding one connecting base 140 and cover one end E1 of the central frame 130, and another first baffle plate 150 disposed around the second axle 110b and the fourth axle 120b is adapted to abut the corresponding another connecting base 140 and cover the other end E2 of the central frame 130.

Further, the plurality of first baffle plates 150 is assembled with the plurality of connecting bases 140 and the plurality of central frames 130 in a cross-overlay manner, so that each of the central frames 130 and the two connecting bases 140 engaged therewith are sandwiched between the plurality of first baffle plates 150, thereby avoiding the direct exposure of the central frame 130. In short, the plurality of first baffle plates 150 sandwiches the corresponding at least one central frame 130 and the at least two connecting bases 140.

Further, the two ends E1 and E2 of each of the central frames 130 respectively include a fixed tooth portion 131. Each of the connecting bases 140 includes a planetary tooth portion 141 and a fixing plate 142. The planetary tooth portion 141 meshes with the corresponding fixed tooth portion 131. The fixing plate 142 extends outward along a radial direction RD of the planetary tooth portion 141 and is used for carrying the bodies S1 and S2. Each of the first baffle plates 150 and each of the planetary tooth portions 141 include a first spacing L1 and cover the fixed tooth portion 131 of each of the central frames 130. Since the plurality of first baffle plates 150 extends outside the fixed tooth portion 131 and the planetary tooth portion 141, when a foreign matter FC such as cloth or paper is disposed outside each of the central frames 130, the foreign matter FC is blocked by the plurality of first baffle plates 150 and not easily caught between the fixed tooth portion 131 and the planetary tooth portion 141.

The number of the at least two side frames 160 is, for example, plural. The plurality of side frames 160 is respectively disposed around the first axle 110a, the third axle 120a and the second axle 110b, and the fourth axle 120b, and every two side frames 160 are engaged with each other. The plurality of second baffle plates 170 is disposed around the first axle 110a and the second axle 110b. Each of the second baffle plates 170 extends outside the plurality of side frames 160.

Further, the plurality of second baffle plates 170 is assembled with the plurality of side frames 160 in a cross-overlay manner, so that any two side frames 160 that are engaged with each other are sandwiched between the plurality of second baffle plates 170 to prevent the direct exposure of the engagement position of the two side frames 160. In short, the plurality of second baffle plates 170 sandwiches the corresponding two side frames 160.

Each of the side frames 160 includes an interlocking tooth portion 161, and any two adjacent interlocking tooth portions 161 mesh with each other. By the meshing relationship of the interlocking tooth portions 161, the side frame 160 disposed around the first axle 110a and the third axle 120a and the side frame 160 disposed around the second axle 110b and the fourth axle 120b are mutually rotated and driven. Each of the second baffle plates 170 and each of the interlocking tooth portions 161 include a second spacing L2, and extend outside each of the interlocking tooth portions 161 through the plurality of second baffle plates 170. When a foreign matter FC such as cloth or paper is disposed outside each of the side frames 160, the foreign matter FC is blocked by the plurality of second baffle plates 170 and not easily caught between the two interlocking tooth portions 161 that mesh with each other.

Referring to FIG. 1A and FIG. 1B, the central torsion member 180 is disposed around the first axle 110a and the second axle 110b and abuts the corresponding plurality of first baffle plates 150 and one of the second baffle plates 170. Further, the central torsion member 180 is used for providing a torsion force when the first axle 110a and the second axle 110b pivot.

The two auxiliary torsion members 190 are respectively disposed around the first axle 110a, the third axle 120a and the second axle 110b, and the fourth axle 120b, and respectively abut the corresponding two first baffle plates 150. Further, the two auxiliary torsion members 190 are used for providing a torsion force when the first axle 110a and the third axle 120a pivot, and a torsion force when the second axle 110b and the fourth axle 120b pivot.

Figure 2A:
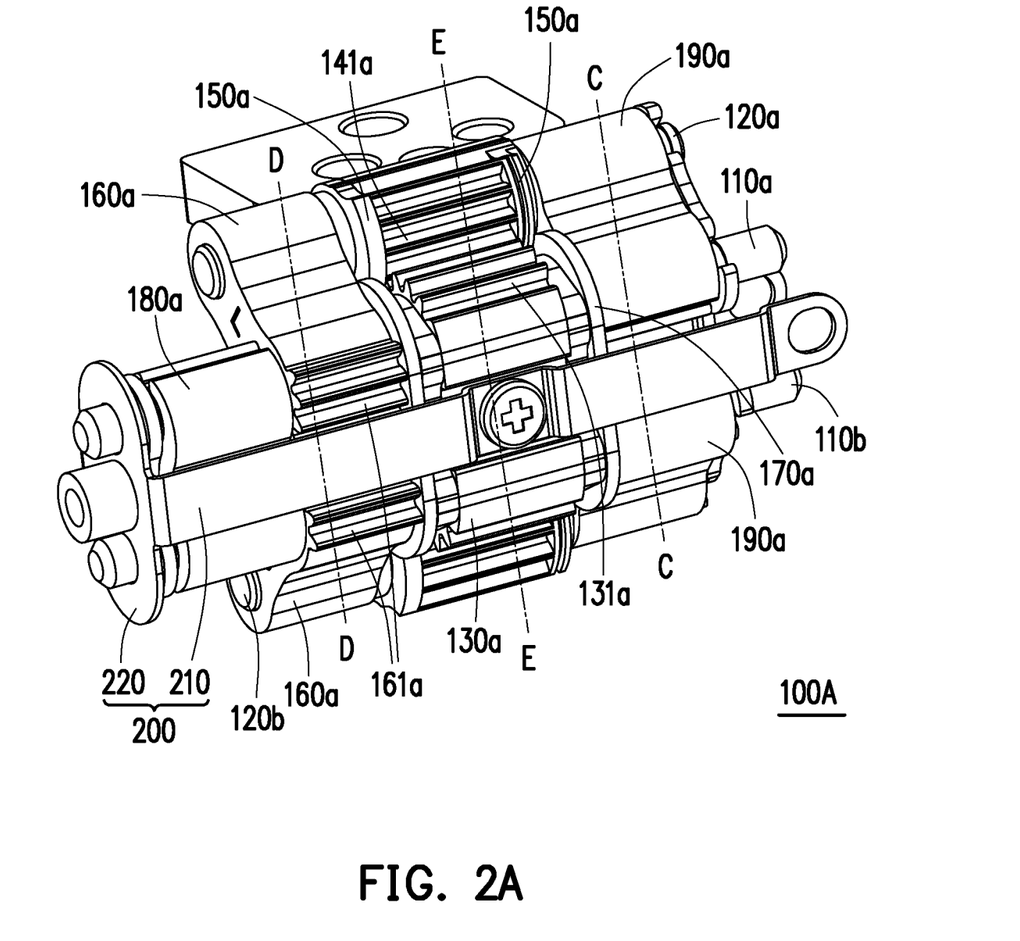
FIG. 2A is a schematic diagram of a synchronous hinge module in a bent state according to another embodiment.
Figure 2B:
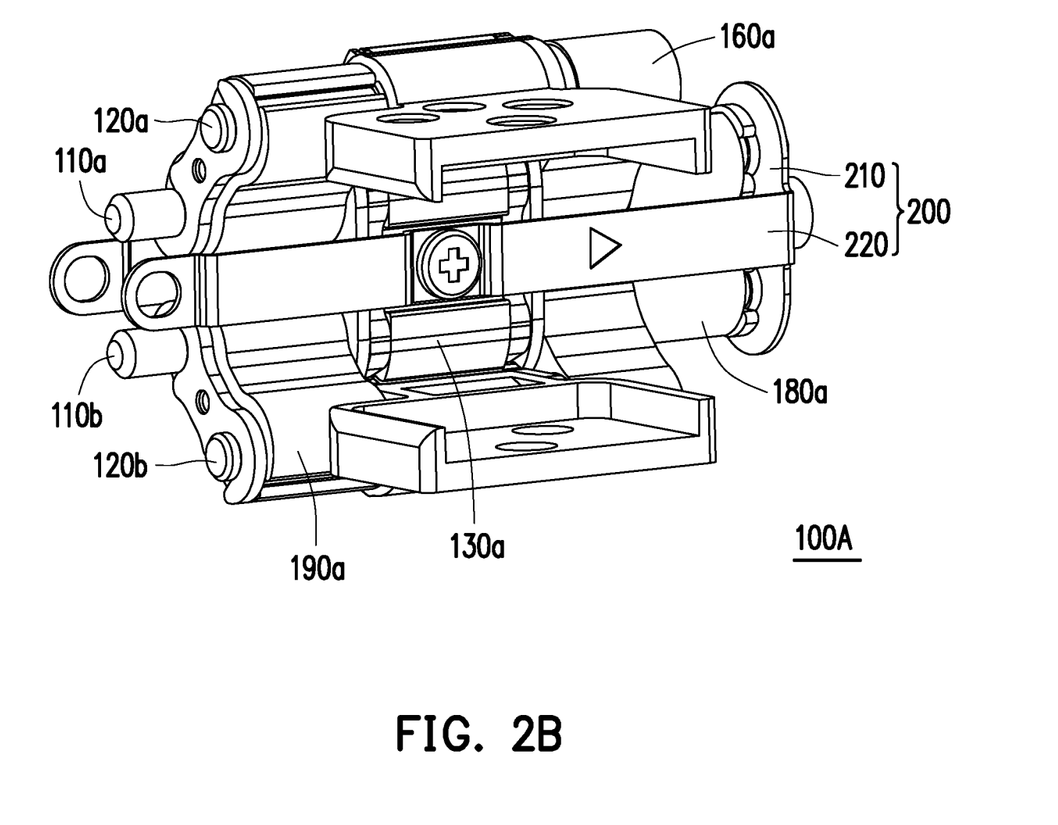
FIG. 2B is a schematic diagram of the synchronous hinge module of FIG. 2A in another bent state.
Figure 2C:
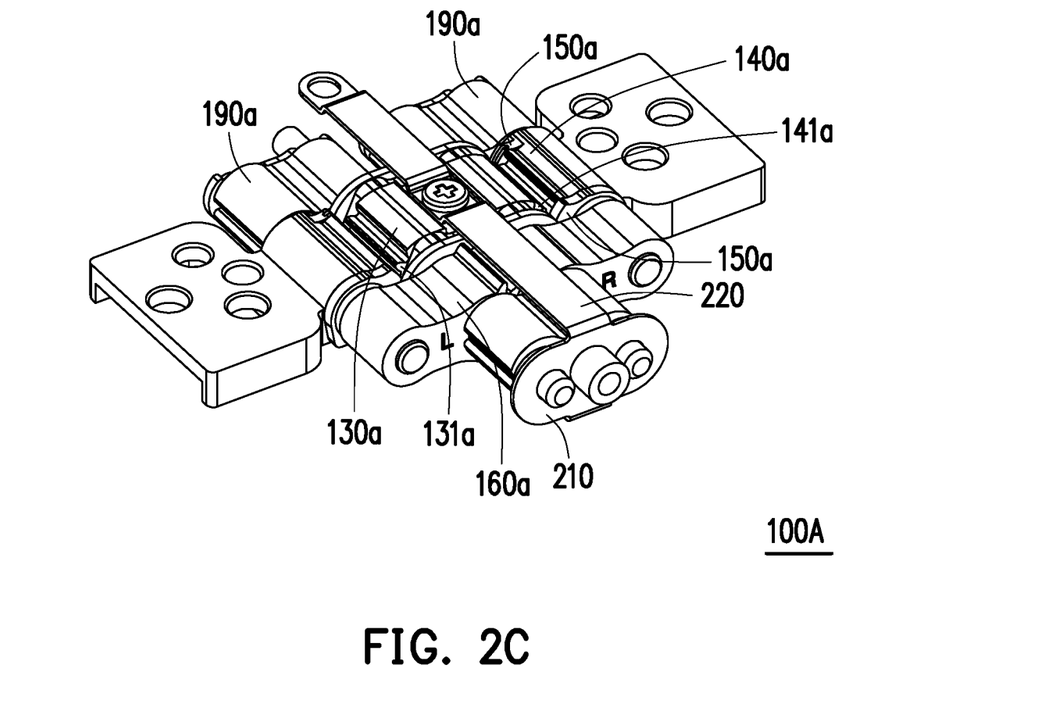
FIG. 2C is a schematic diagram of the synchronous hinge module of FIG. 2A in a flat state.
Figure 2D:
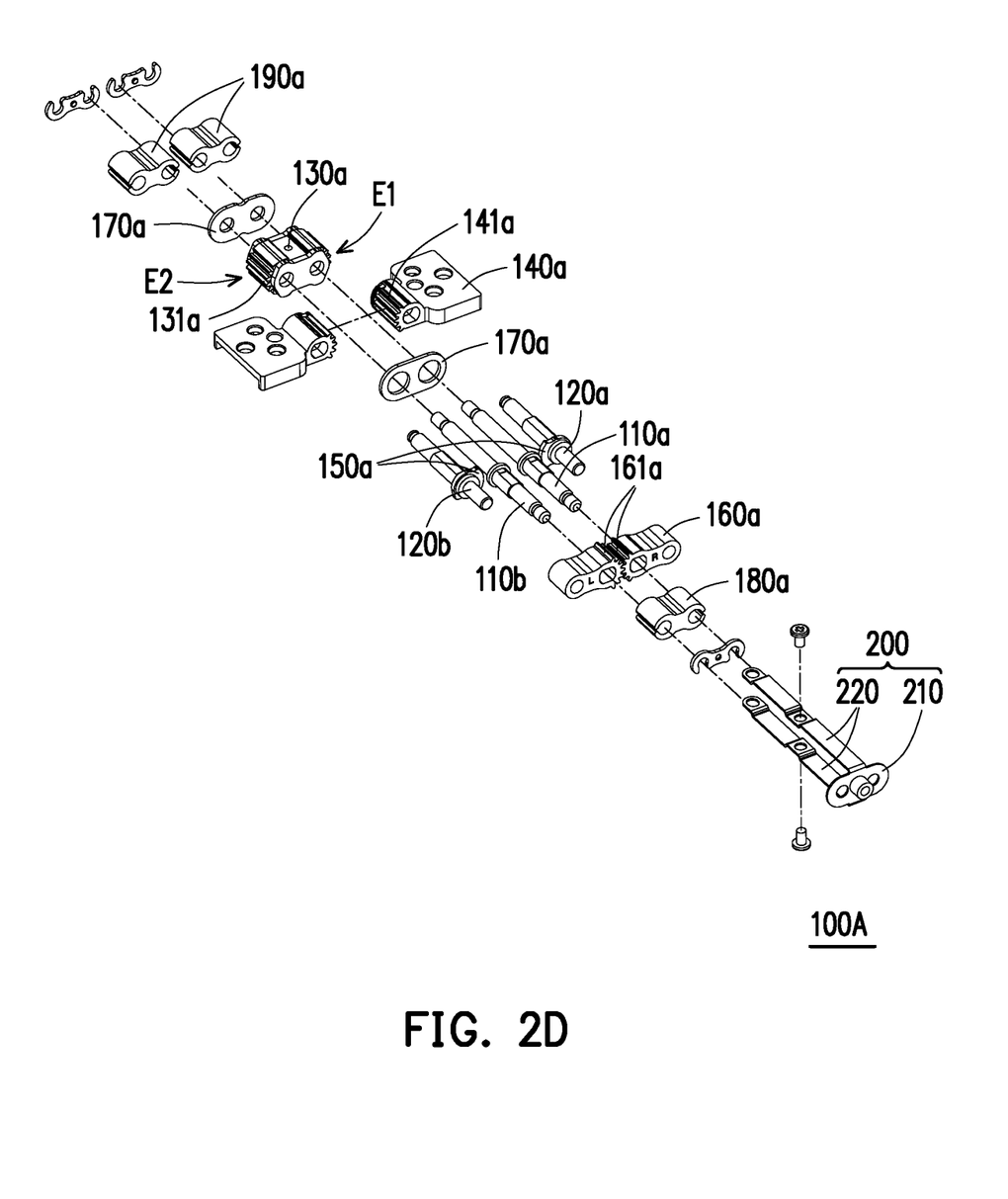
FIG. 2D is an exploded schematic diagram of components of the synchronous hinge module of FIG. 2C.

FIG. 2A is a schematic diagram of a synchronous hinge module in a bent state according to another embodiment. FIG. 2B is a schematic view of the synchronous hinge module of FIG. 2A in another bent state. FIG. 2C is a schematic view of the synchronous hinge module of FIG. 2A in a flat state. FIG. 2D is an exploded schematic view of the synchronous hinge module of FIG. 2C.

Referring to FIG. 2A to FIG. 2D, the synchronous hinge module 100A of the present embodiment is different from the synchronous hinge module 100 shown in FIG. 1A in that a lateral protective plate 200 is further included.

The number of the at least one central frame 130a is one that is disposed around the first axle 110a and the second axle 110b. The number of the at least two connecting bases 140a is two that are respectively disposed around the third axle 120a and the fourth axle 120b and respectively engaged with two opposite ends of the central frame 130a. Further, the two ends E1 and E2 of the central frame 130a respectively include a fixed tooth portion 131a, and each of the connecting bases 140a include a planetary tooth portion 141a meshing with the corresponding fixed tooth portions 131a.

The plurality of first baffle plates 150a is respectively disposed on the third axle 120a and the fourth axle 120b and abuts the corresponding two connecting bases 140a. Each of the first baffle plates 150a extends outside the corresponding connecting bases 140a. Referring to FIG. 2C and FIG. 2D, a portion of the first baffle plates 150a are respectively formed on the corresponding two connecting bases 140a.

The number of the at least two side frames 160a is two, and the side frames 160a are respectively disposed around the first axle 110a, the third axle 120a and the second axle 110b, the fourth axle 120b and engaged with each other. Each of the side frames 160a includes an interlocking tooth portion 161a, and the two interlocking tooth portions 161a mesh with each other.

The number of the plurality of second baffle plates 170a is two, and each of the second baffle plates 170a is disposed around the first axle 110a and the second axle 110b. Each of the second baffle plates 170a extends outside the central frame 130a and covers the two interlocking tooth portions 161a. Further, the two second baffle plates 170a sandwich the two sides of the central frame 130a, and each of the first baffle plates 150a and the corresponding second baffle plates 170a overlap each other.

Referring to FIG. 2A and FIG. 2B, the lateral protective plate 200 is disposed around the first axle 110a and the second axle 110b and partially covers the two side frames 160a and the central frame 130a. In detail, the lateral protective plate 200 includes a positioning portion 210 and two blocking portions 220. The positioning portion 210 is disposed around the first axle 110a and the second axle 110b, the two blocking portions 220 are oppositely disposed on an outer edge of the positioning portion 210, and the two blocking portions 220 are located in parallel on two opposite outer sides of the central frame 130a and the two side frames 160a. In the present embodiment, each of the blocking portions 220 is fixed to the central frame 130a by means of screwing, which is used to avoid the deformation offset of the respective blocking portions 220 due to external forces.

A central torsion member 180a, disposed around the first axle 110a and the second axle 110b and abutting the two side frames 160a and the lateral protective plate 200, is further included. Two auxiliary torsion members 190a, respectively disposed around the first axle 110a, the third axle 120a and the second axle 110b, the fourth axle 120b and abutting one of the second baffle plates 170a, are further included. The two blocking portions 220 of the lateral protective plate 200 partially cover the two auxiliary torsion members 190a.

Figure 3A:
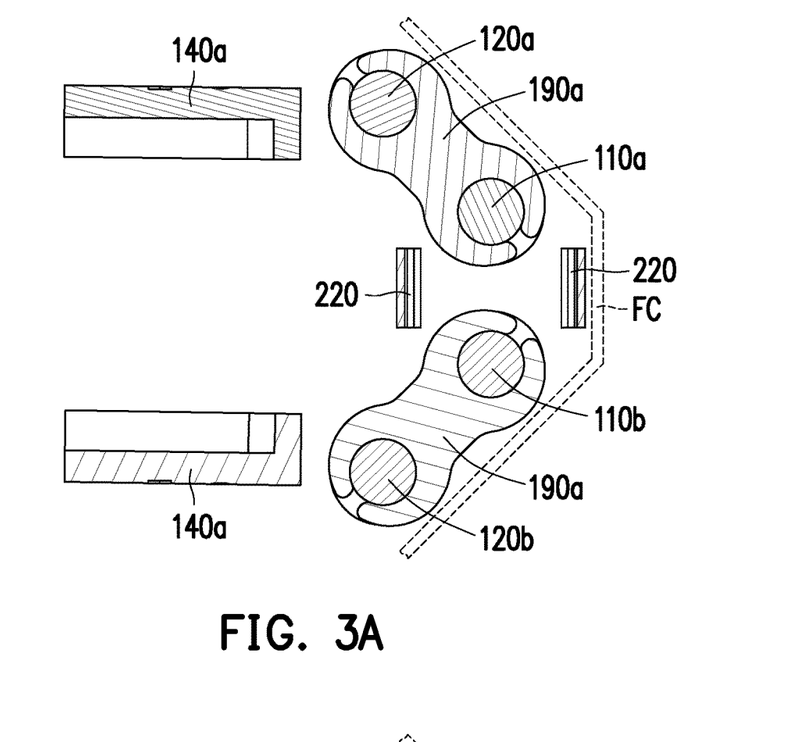
FIG. 3A is a partial structure view of the synchronous hinge module of FIG. 2A taken along section C-C.
Figure 3B:
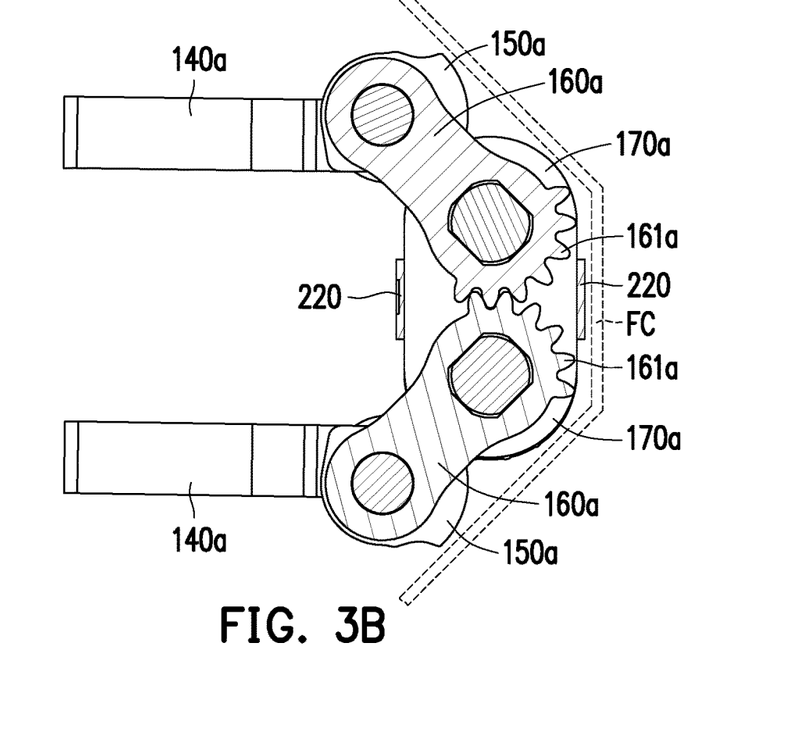
FIG. 3B is a partial structure view of the synchronous hinge module of FIG. 2A taken along section D-D.
Figure 3C:
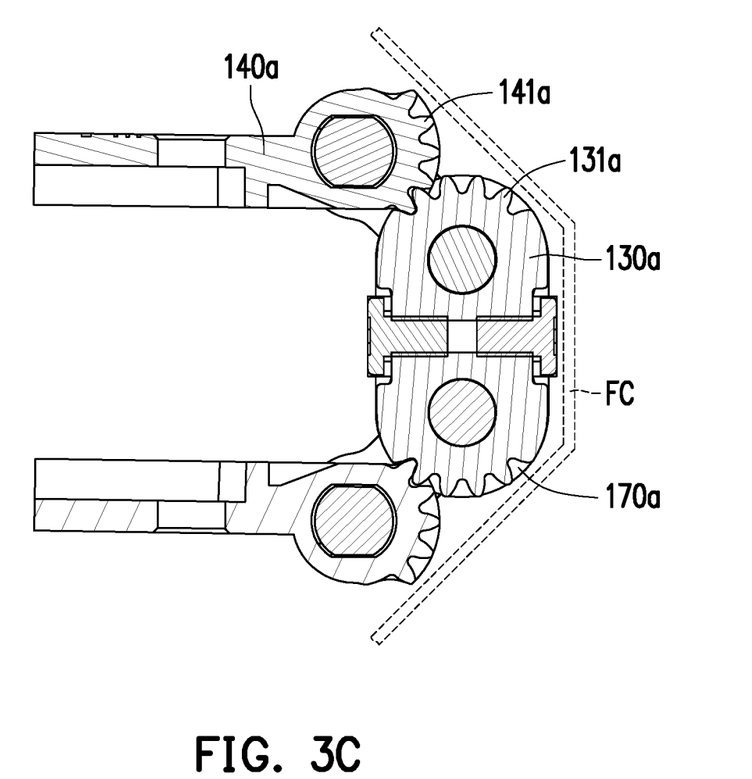
FIG. 3C is a partial structure view of the synchronous hinge module of FIG. 2A taken along section E-E.

FIG. 3A is a partial structure view of the synchronous hinge module of FIG. 2A taken along section C-C. FIG. 3B is a partial structure view of the synchronous hinge module of FIG. 2A taken along section D-D. FIG. 3C is a partial structure view of the synchronous hinge module of FIG. 2A taken along section E-E.

Referring to FIG. 2A, FIG. 3A and FIG. 3B, the two blocking portions 220 of the lateral protective plate 200 partially cover the two auxiliary torsion members 190a for blocking a gap between the two auxiliary torsion members 190a. In addition, the two blocking portions 220 partially cover the two interlocking tooth portions 161a that are engaged with each other. Accordingly, the two blocking portions 220 are adapted to block the foreign matter FC, and prevent the foreign matter FC from being caught between the two auxiliary torsion members 190a or the two interlocking tooth portions 161a when the synchronous hinge module 100A is relatively rotated.

Referring to FIG. 2A and FIG. 3C, each of the first baffle plates 150a is adapted to cover the planetary tooth portions 141a of each of the connecting bases 140a, and each of the second baffle plates 170a is adapted to cover the two fixed tooth portions 131a of the central frame 130a. Each of the first baffle plates 150 and each of the second baffle plates 170a extend outside the corresponding fixed tooth portion 131a and the planetary tooth portion 141a, and are adapted to block the foreign matter FC, and to prevent the foreign matter FC from being caught between the fixed tooth portion 131a and the planetary tooth portion 141a that mesh with each other when the synchronous hinge module 100A is relatively rotated.

Based on the above, in the synchronous hinge module, a plurality of first baffle plates extending outside the at least one central frame and the at least two connecting bases are provided to block the foreign matters from being caught in the engagement region of the central frame and the connecting bases and also prevent the central frame from directly colliding with external objects and causing damage. The plurality of second baffle plates extending outside the at least two side frames are further provided to block the foreign matters from being caught in the engagement region between the side frames and also prevent the side frames from directly colliding with external objects and causing damage, thereby ensuring the stability of the synchronous hinge module in the operation state.

Further, the synchronous hinge module of another embodiment further includes the lateral protective plate used to cover the two side frames and the two auxiliary torsion members, so as to avoid the exposure of the engagement region of the two side frames and the spacing region between the two auxiliary torsion members to block foreign matters from being caught and reduce damage.

Although the present invention is described with the above embodiments, it is not intended to limit the present invention. Any person of ordinary skill in the art can make some changes and modifications without departing from the spirit and the scope of the present invention. Therefore, the protection scope shall be defined by the appended claims.

What is claimed is:

1. A synchronous hinge module, comprising:
a first axle;
a second axle, parallel to the first axle;
a third axle, adjacent to the first axle;

a fourth axle, adjacent to the second axle;
at least one central frame, encircling the first axle and the second axle;
at least two connecting bases, respectively encircling the third axle and the fourth axle and respectively engaged with two opposite ends of the at least one central frame;
a plurality of first baffle plates, respectively encircling the first axle, the third axle and the second axle, the fourth axle, wherein each of the first baffle plates extends outside each of the at least two connecting bases and the at least one central frame;
at least two side frames, respectively encircling the first axle, the third axle and the second axle, the fourth axle and engaged with each other; and
a plurality of second baffle plates, encircling the first axle and the second axle, wherein each of the second baffle plates extends outside the at least two side frames,
wherein each of the at least two side frames comprises an interlocking tooth portion, the at least two interlocking tooth portions mesh with each other.

2. The synchronous hinge module according to claim 1, wherein the two ends of the at least one central frame respectively comprise a fixed tooth portion, each of the at least two connecting bases comprises a planetary tooth portion, each of the planetary tooth portions meshes with the corresponding fixed tooth portions.

3. The synchronous hinge module according to claim 1, wherein the first baffle plates sandwich the corresponding at least one central frame and the at least two connecting bases.

4. The synchronous hinge module according to claim 1, further comprising a central torsion member, encircling the first axle and the second axle and abutting the corresponding first baffle plates and one of the second baffle plates.

5. The synchronous hinge module according to claim 1, further comprising two auxiliary torsion members, respectively encircling the first axle, the third axle and the second axle, the fourth axle, and respectively abutting the corresponding first baffle plates.

6. A synchronous hinge module, comprising:
a first axle;
a second axle, parallel to the first axle;
a third axle, adjacent to the first axle;
a fourth axle, adjacent to the second axle;
at least one central frame, encircling the first axle and the second axle;
at least two connecting bases, respectively encircling the third axle and the fourth axle and respectively engaged with two opposite ends of the at least one central frame;
a plurality of first baffle plates, respectively disposed on the third axle and the fourth axle, wherein each of the first baffle plates extends outside each of the at least two connecting bases;
at least two side frames, respectively encircling the first axle, the third axle and the second axle, the fourth axle and engaged with each other;
a plurality of second baffle plates, encircling the first axle and the second axle, wherein each of the second baffle plates extends outside the at least one central frame; and
a lateral protective plate, encircling the first axle and the second axle and partially covering the at least two side frames and the at least one central frame.

7. The synchronous hinge module according to claim 6, wherein the second baffle plates sandwich the at least one central frame, and each of the first baffle plates and the corresponding second baffle plates overlap each other.

8. The synchronous hinge module according to claim 6, wherein a portion of the first baffle plates are respectively formed on the corresponding at least two connecting bases.

9. The synchronous hinge module according to claim 6, wherein the lateral protective plate comprises a positioning portion and two blocking portions, the positioning portion encircles the first axle and the second axle, the two blocking portions are oppositely disposed on the positioning portion, and the two blocking portions are located in parallel on two opposite outer sides of the at least one central frame and the at least two side frames.

10. The synchronous hinge module according to claim 9, wherein each of the blocking portions is fixed to the at least one central frame.

11. The synchronous hinge module according to claim 6, wherein the two ends of the at least one central frame respectively comprise a fixed tooth portion, each of the at least two connecting bases comprises a planetary tooth portion, and each of the planetary tooth portions meshes with the corresponding fixed tooth portions.

12. The synchronous hinge module according to claim 6, wherein each of the at least two side frames comprises an interlocking tooth portion, and the at least two interlocking tooth portions mesh with each other.

13. The synchronous hinge module according to claim 6, further comprising a central torsion member, encircling the first axle and the second axle.

14. The synchronous hinge module according to claim 6, further comprising two auxiliary torsion members, respectively encircling the first axle, the third axle and the second axle, the fourth axle, wherein the lateral protective plate partially covers the two auxiliary torsion members.

* * * * *